Patented Mar. 5, 1935

1,993,030

UNITED STATES PATENT OFFICE 1,993,030

SYNTHETIC RESIN AND METHOD OF PRODUCING

Ernest G. Peterson, Wilmington, Del., assignor to Hercules Powder Company, Wilmington, Del., a corporation of Delaware No Drawing. Application September 2, 1933, Serial No. 688,068

24 Claims. (Cl. 260—3)

This invention relates to a synthetic resin and method for its production.

The synthetic resins in accordance with this invention will be prepared by reacting an acidic resinous complex, formed from terpinene, maleic anhydride, and a compound containing the abietyl radical, with a polyhydric alcohol and an organic acid. The synthetic resin in accordance with this invention will comprise the product of such reaction.

The synthetic resins in accordance with this invention will have varying characteristics depending upon the precise procedure followed and the characteristics of the resinous complex used in its production, but generally will be adaptable as an ingredient for use in lacquers, varnishes, plastics, etc.

The resinous complex, or reaction product for use in producing the synthetic resin in accordance with this invention may be produced, as more fully disclosed in the application for United States Letters Patent filed by me, Ernest G. Peterson, Serial No. 600,051, filed March 19, 1932, by reacting terpinene, which may be readily derived from terpenes, as pinene, dipentene, alpha terpineol, etc., by treatment with sulphuric acid, with maleic anhydride, or an equivalent amount of maleic acid, and a compound containing the abietyl radical as, for example, abietic acid, wood or gum rosin, an ester of abietic acid as methyl abietate, ethyl abietate, ester gum, etc., etc. The reaction may be carried out with the reagents in widely varying proportions and under varying conditions all as is fully disclosed in my said application Serial No. 600,051, filed March 15, 1932.

For the production of the synthetic resin in accordance with this invention any suitable polyhydric alcohol or mixture thereof may be used, as for example, glycerol, polyglycerol, pentaerythrite, a glycol such as ethylene glycol, propylene glycol, or the like, etc. Substituted polyhydric alcohols, as for example, glyceryl monoacetate, glyceryl monoethyl ether, glyceryl monochlorhydrin, etc. may also be used, and they are included in the term "polyhydric alcohol" as used herein. The polyhydric alcohol may be used in admixture with various monohydric alcohols, such as methyl, ethyl, butyl alcohols, etc.

As the second, or modifying acid, such organic acids as, for example, stearic acid, palmitic and oleic acid, ricinoleic acid, linseed oil fatty acids, China wood oil fatty acids, castor oil fatty acids, succinic acid, maleic acid, tartaric acid, adipic acid, sebacic acid, etc., etc., or mixtures thereof, may be used.

The fatty acids derived from natural glycerides may be used in the form of the natural glycerides themselves, since under the conditions of the reaction these glycerides break down and free the fatty acids.

In carrying out the method in accordance with this invention there is no necessity for the use of any particular form or type of apparatus. The reagents may be reacted in widely varying proportions depending more or less upon the characteristics desired for the product, and the reaction may be carried out under widely varying conditions as, for example, of pressure, temperature, etc.

Generally speaking the reaction will be carried out under atmospheric pressure although superatmospheric pressure may be used if desired. The reaction may be carried out at any suitable temperature, however, since the application of heat will facilitate the reaction it will preferably be carried out at a temperature, say, for example, within the range of 75 to 275° C.

As illustrative of the practical adaptation of the method in accordance with this invention, a suitable acidic resinous complex or primary reaction product may be prepared by heating at about 200° C., for about three hours, at atmospheric pressure, 165 parts of abietic acid, 98 parts of maleic anhydride and 85 parts of alpha-terpinene, (parts by weight) and on completion of the reaction reducing the pressure to say about 15 mm. mercury to distill off any unreacted maleic anhydride and inert ingredients associated with the alpha-terpinene.

The acidic resinous complex or reaction product as described and having a direct acid number of about 250 and a saponification value of about 400, is then reacted in the amount of 160 parts, by weight, with 142 parts of stearic acid and 128 parts of glycerol. The reactants are heated together with suitable agitation at a temperature of 200°–210° C. for about 8 hours. The resulting product is a soft wax-like resin, soluble in the usual organic solvents with the exception of alcohols, and highly suitable for use in nitrocellulose, or other cellulose ester, lacquers.

As further illustrative of the production of a synthetic resin in accordance with this invention, using, for example, a dibasic organic acid, 116 parts, by weight, of the terpinene-maleic anhydride-abietic acid resinous complex, described above, 60 parts of succinic acid, 47 parts of glycerol and 31 parts of ethylene glycol are heated together with good agitation at a temperature of approximately 210° C., continuing the heating till the cooled resin is of the desired hardness. After 6 hours heating at this temperature the resin is quite hard and reasonably tough. At this stage it is fusible and soluble in acetone and ethyl acetate but insoluble in alcohol and toluol. In this form the resin may be used with nitrocellulose to yield lacquers possessing excellent durability and light resistance. By continuing the heating preferably at lower temperatures, say 150 to 175° C., an infusible, insoluble stage may be reached. The resin in this form may be used in molding compositions either alone or mixed with fillers such as wood flour.

As further illustrative of the production of a synthetic resin in accordance with this invention, using, for example, the fatty acids derived from a drying oil, 320 parts, by weight, of the terpinene-maleic anhydride-abietic acid resinous complex, described, 283 parts of linseed oil fatty acids, and 128 parts of glycerol are heated with suitable agitation at a temperature of about 220°–225° C. for about 8 hours. The reaction is carried out in an atmosphere of inert gas, such as, carbon dioxide, nitrogen, etc., to prevent oxidation of the linseed oil fatty acids. Reduced pressure may be applied to remove any unreacted glycerol. The resulting resinous product is an extremely viscous liquid, is very adhesive and is soluble in drying oils and in the ordinary solvents, such as acetone, ethyl acetate, benzene, etc. It has an acid number of 23.

A varnish can be made up from the above modified resin as follows:

100 parts by weight of modified resin and 50 parts of China wood oil are heated to 290° C., cooled to 260° C. and bodied at that temperature. When the desired body is reached, it is cooled to 225° C. and thinned with equal parts of a 1:1 mixture of turpentine and mineral spirits. Two parts by weight each of cobalt linoleate and lead linoleate are added.

There are practically no limits to the ratio of amount of resin to oil that can be used, the type of varnish desired being the determining factor. Varnishes of this type will dry tack free in 3 to 4 hours. They possess excellent resistance to weathering and ultra-violet light.

It will be understood that the invention is not limited to the particular terpinene-maleic anhydride-abietic acid resinous complex described above, but that such resinous complexes made with varying proportions of the several ingredients may be substituted in the examples for the one therein given by way of illustration.

It will be understood that the synthetic resin in accordance with my invention comprises broadly the reaction product of a polyhydric alcohol, an organic acid, and a resinous complex or reaction product formed, under any conditions, by the reaction of terpinene, maleic anhydride and a compound containing the abietyl radical.

In accordance with the method embodying my invention the synthetic resin may be formed by the use of the resinous complex described, a polyhydric alcohol, and an organic acid in widely varying proportions and under any operable conditions.

It will be further understood that the synthetic resin in accordance with my invention is contemplated by me as adapted variously for various uses as in forming molded objects in lacquers and in varnishes, it being understood that the synthetic resins are variously adaptable for use with the numerous ingredients heretofore used in plastics, lacquers and varnishes, and that variously they are capable of plasticizing nitrocellulose.

This application is a continuation in part of the application filed by me March 19, 1932, Serial No. 600,051.

What I claim and desire to protect by Letters Patent is:

1. A synthetic resin produced by combining a polyhydric alcohol, an organic carboxylic acid, and a reaction product formed by combining terpinene, maleic anhydride, and a compound containing the abietyl radical.

2. A synthetic resin produced by combining a polyhydric alcohol, a dibasic organic carboxylic acid, and a reaction product formed by combining terpinene, maleic anhydride, and a compound containing the abietyl radical.

3. A synthetic resin produced by combining a polyhydric alcohol, stearic acid, and a reaction product formed by combining terpinene, maleic anhydride, and a compound containing the abietyl radical.

4. A synthetic resin produced by combining a polyhydric alcohol, succinic acid, and a reaction product formed by combining terpinene, maleic anhydride, and a compound containing the abietyl radical.

5. A synthetic resin produced by combining a polyhydric alcohol, linseed oil fatty acids, and a reaction product formed by combining terpinene, maleic anhydride, and a compound containing the abietyl radical.

6. A synthetic resin produced by combining a polyhydric alcohol, an organic carboxlyic acid, and a reaction product formed by combining terpinene, maleic anhydride, and abietic acid.

7. A synthetic resin produced by combining a polyhydric alcohol, a dibasic organic carboxylic acid, and a reaction product formed by combining terpinene, maleic anhydride, and abietic acid.

8. A synthetic resin produced by combining a polyhydric alcohol, an organic carboxylic acid, and a reaction product formed by combining terpinene, maleic anhydride, and an abietic acid ester.

9. A synthetic resin produced by combining a polyhydric alcohol, succinic acid, and a reaction product formed by combining terpinene, maleic anhydride, and abietic acid.

10. A synthetic resin produced by combining a polyhydric alcohol, linseed oil fatty acids, and a reaction product formed by combining terpinene, maleic anhydride, and abietic acid.

11. The method of producing a synthetic resin which includes reacting a polyhydric alcohol, an organic carboxylic acid, and a reaction product of terpinene, maleic anhydride, and a compound containing the abietyl radical, said compound being of a character such that the abietyl radical is available for reaction.

12. The method of producing a synthetic resin which includes reacting in an inert atmosphere a polyhydric alcohol, a fatty acid derived from a drying oil, and a reaction product of terpinene, maleic anhydride, and a compound containing the abietyl radical, said compound being of a character such that the abietyl radical is available for reaction.

13. A synthetic resin produced by combining a polyhydric alcohol, a fatty acid, and a reaction product formed by combining terpinene, maleic anhydride, and a compound containing the abietyl radical.

14. The method of producing a synthetic resin which includes reacting a polyhydric alcohol, a dibasic organic carboxylic acid, and a reaction product of terpinene, maleic anhydride and a compound containing the abietyl radical, said compound being of a character such that the abietyl radical is available for reaction.

15. A coating composition comprising the reaction product of a polyhydric alcohol, an organic carboxylic acid, and an acidic composition formed from terpinene, maleic anhydride and a compound containing the abietyl radical, and a solvent.

16. A coating composition comprising the reaction product of a polyhydric alcohol, an organic carboxylic acid, and an acidic composition formed from terpinene, maleic anhydride and a compound containing the abietyl radical, a lacquer ingredient and a solvent.

17. A coating composition comprising the reaction product of a polyhydric alcohol, an organic carboxylic acid, and an acidic composition formed from terpinene, maleic anhydride and a compound containing the abietyl radical, a varnish ingredient and a solvent.

18. A synthetic resin produced by combining a polyhydric alcohol selected from the group consisting of glycerol and aliphatic glycols, an organic carboxylic acid, and a reaction product formed by combining terpinene, maleic anhydride, and a compound containing the abietyl radical.

19. A synthetic resin produced by combining a polyhydric alcohol selected from the group consisting of glycerol and aliphatic glycols, a dibasic organic carboxylic acid, and a reaction product formed by combining terpinene, maleic anhydride, and a compound containing the abietyl radical.

20. A synthetic resin produced by combining a polyhydric alcohol selected from the group consisting of glycerol and aliphatic glycols, a fatty acid, and a reaction product formed by combining terpinene, maleic anhydride, and a compound containing the abietyl radical.

21. A synthetic resin produced by combining a polyhydric alcohol selected from the group consisting of glycerol and aliphatic glycols, an organic carboxylic acid and a reaction product formed by combining terpinene, maleic anhydride, and rosin.

22. A synthetic resin produced by combining a polyhydric alcohol selected from the group consisting of glycerol and aliphatic glycols, a dibasic organic carboxylic acid, and a reaction product formed by combining terpinene, maleic anhydride, and abietic acid.

23. A synthetic resin produced by combining a polyhydric alcohol, a fatty acid, and a reaction product formed by combining terpinene, maleic anhydride, and abietic acid.

24. A synthetic resin produced by combining a polyhydric alcohol selected from the group consisting of glycerol and aliphatic glycols, a fatty acid, and a reaction product formed by combining terpinene, maleic anhydride, and abietic acid.

ERNEST G. PETERSON.